2,943,827
LANDING GEAR CONSTRUCTION

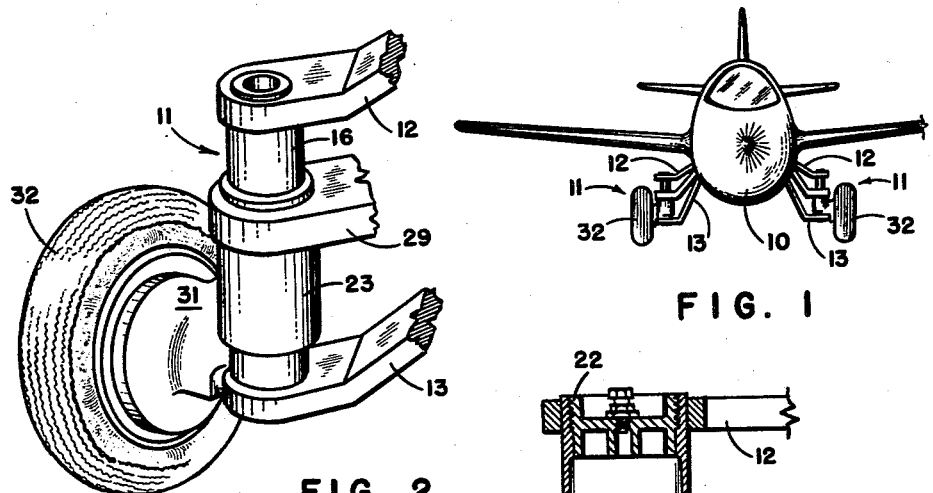
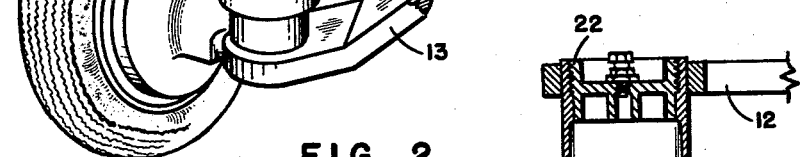
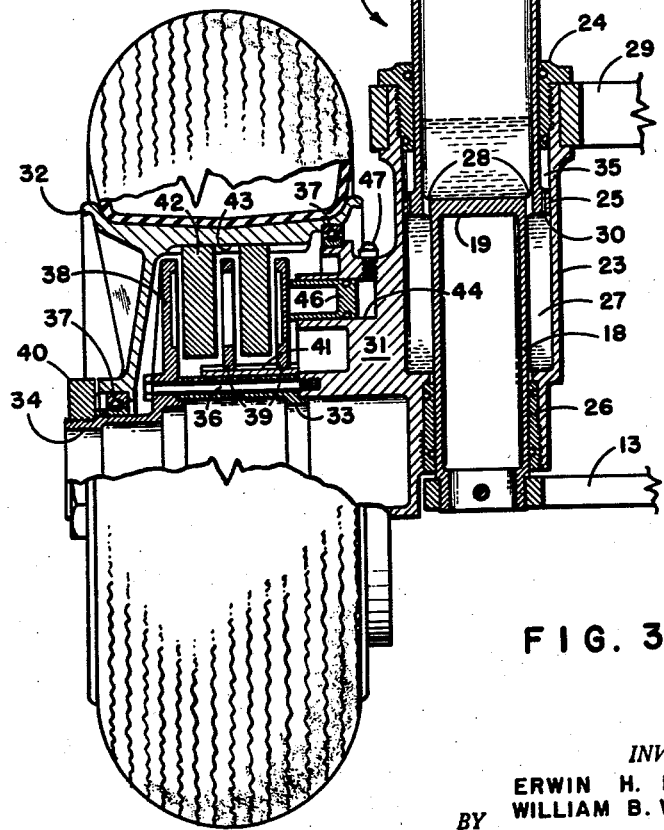
INVENTORS
ERWIN H. HARTEL
WILLIAM B. WESTCOTT, Jr.
ATTORNEY United States Patent Office 2,943,827
Patented July 5, 1960

Erwin H. Hartel, Cleveland, and William B. Westcott, Jr., Cleveland Heights, Ohio, assignors to Cleveland Pneumatic Industries, Inc., a corporation of Ohio Filed June 20, 1955, Ser. No. 516,434

1 Claim. (Cl. 244—111)

This invention relates generally to landing gears and more particularly to a new and improved landing gear and brake system.

It is an important object of this invention to provide an aircraft landing gear suitable for use on aircraft wherein the landing gear cannot be retracted into the wing and therefore must be retracted into the fuselage.

It is another important object of this invention to provide an aircraft landing gear incorporating a piston adapted to be fixed to the aircraft surrounded by a cylinder movable relative to the piston on which is mounted the ground engaging wheel.

It is still another object of this invention to provide a landing gear incorporating a stationary piston surrounded by a cylinder slidable relative thereto wherein a ground engaging wheel is mounted on the cylinder and the brake actuating mechanism is formed integrally therewith.

Further objects and advantages will appear from the following description and drawings, wherein:

Figure 1 is an elevation of an aircraft equipped with a landing gear according to this invention;

Figure 2 is an enlarged fragmentary view of the oleo portion of the landing gear; and, Figure 3 is a side elevation partially in longitudinal section showing the details of the oleo mechanism and of the wheel mounting including the integral brake actuating means.

In the modern high speed aircraft, the thickness of the airfoil has been reduced to a point where it is impossible to retract the landing gear into the wing. Therefore, it is necessary to provide a landing gear structure that may be retracted into the fuselage of the aircraft. A landing gear, according to this invention, overcomes the difficulties which are inherent in such applications while providing a light weight structure that meets all of the strength and service requirements.

Referring to the drawings, Figure 1 discloses the preferred form of landing gear according to this invention wherein the landing gear is mounted on an aircraft having a fuselage 10 into which the landing gear retracts. The oleo portion 11 of the landing gear is carried by laterally extending strut members 12 and 13 which are mounted on the fuselage 10. The oleo 11 includes a piston member 16 supported at both ends between the struts 12 and 13 so that it is fixed relative to the aircraft when the landing gear is in the extended position shown in the drawings. Those skilled in the art will recognize that a very strong structure is produced when both ends of the piston 16 are supported in this manner. The piston is provided with an upper cylindrical portion 17 having a first cross section and a lower cylindrical portion 18 having a smaller cross section than the upper cylindrical portion 17. A bulkhead 19 separates the two portions and provides the structural connection therebetween. An upper chamber 21 is defined by the upper portion 17, the bulkhead 19 and a cap member 22. Positioned around the piston 16 is a cylinder member 23 provided with a first gland nut 24 at its upper end which is adapted to slide along the outer surface of the upper portion 17 and a second gland nut 26 at its lower end adapted to slide along the outer surface of the lower portion 18. The two gland nuts cooperate to provide lateral support or bearing for the cylinder 23 and also cooperate with the cylinder and piston 16 to define a lower annular chamber 27 around the piston. The bulkhead 19 is formed with a plurality of orifices 28 which connect the upper chamber 21 and the annular chamber 27 to provide a restricted flow connection which dissipates energy when fluid flows from one chamber to the other and serves to provide shock absorbing action. A flange 25 provided with one or more orifices 30 may be formed on the piston to divide the lower chamber and provide a rebound chamber 35.

The chamber 27 is completely filled with oil as is the lower portion of the chamber 21 and the upper portion of the chamber 21 is precharged with air under pressure. Since the upper and lower portions 17 and 18 are provided with different cross section areas, an axial reaction is created by the pressure of the fluid contained within the oleo operating over the differential area between the upper and lower portions 17 and 18 which provides the fluid spring action utilized to support the load of the aircraft on the ground. This reaction force urges the cylinder 23 downwardly relative to the piston 16. A torque arm 29 is mounted on the upper end of the cylinder 23 and is in turn connected to a link anchored on the fuselage 10 to prevent rotation of the cylinder 23 relative to the piston 16 when the landing gear is extended. When the cylinder 23 moves upwardly relative to the piston 16 the volume of rebound chamber 35 increases and hydraulic oil flows therein through the orifices 30. If the aircraft bounces on impact with the ground, the operation of the fluid spring tends to urge the cylinder 23 downward relative to the piston 16. Such a move decreases the volume of the rebound chamber 35 and tends to cause flow of hydraulic oil out of the rebound chamber 35 through the orifices 30. The restriction of such flow resists the motion of the cylinder and thereby tends to reduce rebounding of the cylinder.

The cylinder 23 is formed with an enlarged wheel mounting portion 31 on which is mounted a ground engaging wheel 32. In the preferred wheel mounting, shown in Figure 3, a spacer member 33 and an outer bearing support 34 are bolted to the mounting portion 31 by means of a plurality of bolts 36. The wheel 32 is journaled at its outer side on the bearing support 34 and adjacent to its inner side on the mounting portion 31 by antifriction bearings 37. A nut 40 threaded on the bearing support 34 retains the outboard bearing 37 in place and thereby completes the mounting of the wheel.

The bearing support 34 is provided with a radially extending brake flange 38 which is fixed relative to the landing gear. A plurality of axially movable rotationally fixed brake discs 39 are mounted on the spacer member 33 by a spline connection 41 and interspaced between the brake discs 39 and the brake flange 38 are rotatable brake discs 42 which are supported on the wheel 32 by a spline connection 43 so they are axially movable and rotatably fixed relative thereto. When the right hand brake disc 39 is moved axially to the left along the spacer member 33, the rotatable brake discs 42 are clamped between the non-rotatable brake discs and frictional drag resists rotation of the wheel.

The mounting portion 31 is provided with symmetrically located bores 44 only one of which is shown in Figure 3 that serve as the cylinders for brake actuating pistons 46. These pistons 46 engage the right hand stationary brake disc 39 and provide the force for applying the brakes when fluid under pressure is introduced into the bores 44 through a hydraulic fitting 47.

By utilizing a structure wherein the brake actuating means is integrally formed in the mounting portion 31, it is possible to reduce the weight of the landing gear substantially while maintaining a satisfactory structural strength. Because the wheel must be mounted on a relatively thin walled cylinder 23, it is necessary to provide a substantial fillet along the area where the wheel mounting portion 31 joins the cylinder proper. This is necessary to distribute the load and prevent concentrated stresses which could cause failure along the joint between the cylinder and the mounting portion. Since it is necessary to provide a large mounting portion to prevent excessive stress from occurring, it is desirable to utilize the mounting portion for brake actuating cylinders, thus arranging the mounting portion 31 so that it not only supports the wheel but provides the necessary brake actuating structure.

Although a preferred embodiment of this invention is illustrated, it will be realized that various modifications of the structural details may be made without departing from the mode of operation and the essence of the invention. Therefore, except insofar as they are claimed in the appended claim, structural details may be varied widely without modifying the mode of operation. Accordingly, the appended claim and not the aforesaid detailed description is determinative of the scope of the invention.

We claim:

An aircraft landing gear comprising an oleo shock strut, means adapted to connect said oleo shock strut to an aircraft, a laterally extending mounting portion formed integrally with said oleo shock strut, an outer bearing support having a cross section substantially less than the cross section of said mounting portion supported by said mounting portion, an inner bearing on said mounting portion, an outer bearing on said bearing support, a wheel mounted on said bearings journalled for rotation relative to said oleo shock strut, a brake operably connected between said mounting portion and wheel operable to resist relative rotation therebetween, said mounting portion being formed with a laterally extending bore within the inner circumference of said inner bearing, and a fluid actuated piston in said bore connected to operate said brake.

References Cited in the file of this patent
UNITED STATES PATENTS

| | | |
|---|---|---|
| 1,727,696 | Breguet | Sept. 10, 1929 |
| 1,851,623 | Flader | Mar. 29, 1932 |
| 2,192,281 | Wallace | Mar. 5, 1940 |
| 2,363,485 | Down | Nov. 28, 1944 |
| 2,574,426 | Trevaskis | Nov. 6, 1951 |
| 2,707,604 | Dowty | May 3, 1955 |